United States Patent

[11] 3,522,775

| [72] | Inventors | Lester John Fox<br>Glen Allen, Virginia;<br>Sidney B. McMillion, Richmond, Virginia |
|---|---|---|
| [21] | Appl. No. | 824,715 |
| [22] | Filed | March 3, 1969 |
| [45] | Patented | Aug. 4, 1970 |
| | Continuation of Ser. No. 670,904, Sept. 27, 1967. | |
| [73] | Assignee | Eskimo Pie Corporation<br>Richmond, Virginia<br>a Corp. of Delaware<br>Continuation of application Ser. No. 670,904, Sept. 27, 1967, now abandoned . This application 000000000 |

[54] METHOD OF PRODUCING MULTIHUED FROZEN CONFECTIONS AND ALL PURPOSE NOZZLE ASSEMBLY THEREFOR
8 Claims, 9 Drawing Figs.

[52] U.S. Cl................................................ 107/1,
107/54, 18/13
[51] Int. Cl................................................ A23g 5/02
[50] Field of Search............................................ 107/1,
1(.4), 54, 54(.4), 54(.45), 54(.6); 18/13(P),
13(F), 13(D); 25/17

[56] References Cited
UNITED STATES PATENTS

| 1,981,928 | 11/1934 | Sheppard et al............. | 107/1(.4) |
| 2,271,767 | 2/1942 | Hummel...................... | 107/1(.4) |
| 2,296,842 | 9/1942 | Garvey et al................. | 18/13P UXR |
| 2,347,083 | 4/1944 | Connellee et al............. | 107/1(.4)XR |
| 2,666,397 | 1/1954 | Skok........................... | 107/1(.4) |
| 3,196,809 | 7/1965 | Nelson et al................. | 107/1(.4) |
| 3,228,356 | 1/1966 | Schafer........................ | 107/1(.4) |
| 3,344,751 | 10/1967 | Cammack et al............. | 107/1(.4) |

*Primary Examiner*— Walter A. Scheel
*Assistant Examiner*— Arthur O. Henderson
*Attorney*—Beveridge & De Grandi ABSTRACT: A method and an all-purpose nozzle assembly for forming flat, frozen confections of different distinctive object shapes in which adjoining areas of the object are of contrasting hues with distinctive outline form. The method comprises passing a conveyor beneath the lower end of an open nozzle passage, supporting within the lower end of the nozzle a replaceable and transversely extending extruder plate having a central cut-out section conforming to the outline shape of the object represented by the confection, installing replaceable partitions longitudinally of the nozzle interior to divide it into compartmentalized segments in which the lower portions of the partitions in conjunction with the extruder plate cut-out define the distinctive outlined areas of the object, introducing a different hued mixture of the confection in a cold, plastically flowable but shape retaining condition into the top portion of each of the adjoining compartments to emerge from the cut-out as a shaped extruded length, periodically severing a portion of the extruded length to fall onto the conveyor and passing the conveyor and severed shapes of the mix through a refrigerated compartment at sub-freezing temperatures.

The nozzle assembly includes a nozzle with an inwardly extending lip at the lower end supporting a replaceable extruder plate having a central cut-out portion corresponding to the outline shape of the object, replaceable partitions insertable into the nozzle interior to extend longitudinally thereof in contact with the extruder plate to divide the nozzle interior into compartments in which the lower portions overlying the extruder plate in conjunction with its cut-out section define the adjoining distinctively outlined areas of different hues in the confection and at least one feed tube projecting into each compartment through a cover plate extending across the top of the nozzle.

Patented Aug. 4, 1970
3,522,775
Sheet 1 of 3
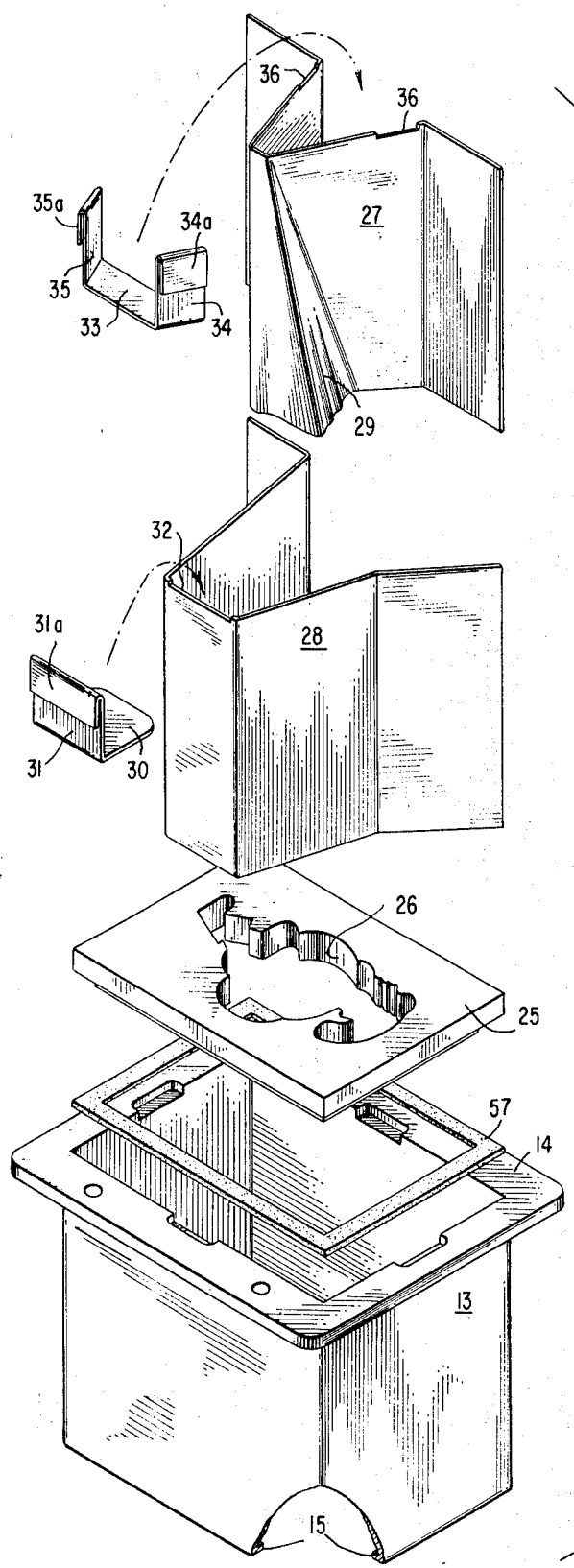
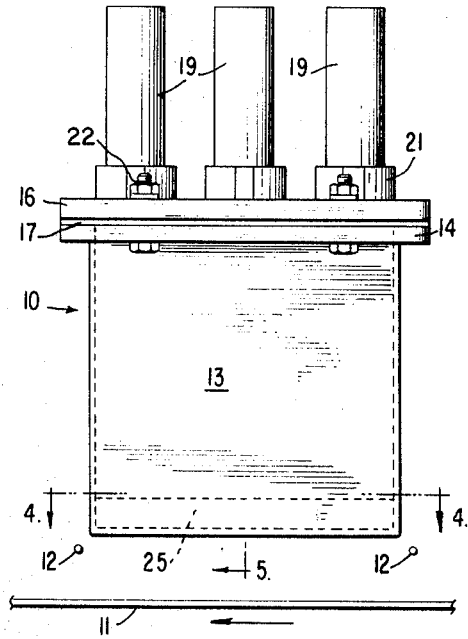
FIG.1
FIG.2
FIG.3
INVENTORS
LESTER JOHN FOX
SIDNEY B. McMILLION
BY *Browne, Schuyler & Beveridge*
ATTORNEYS Patented Aug. 4, 1970

INVENTORS
LESTER JOHN FOX
SIDNEY B. McMILLION
BY Browne, Schuyler & Beveridge
ATTORNEYS Patented Aug. 4, 1970
3,522,775
Sheet 3 of 3
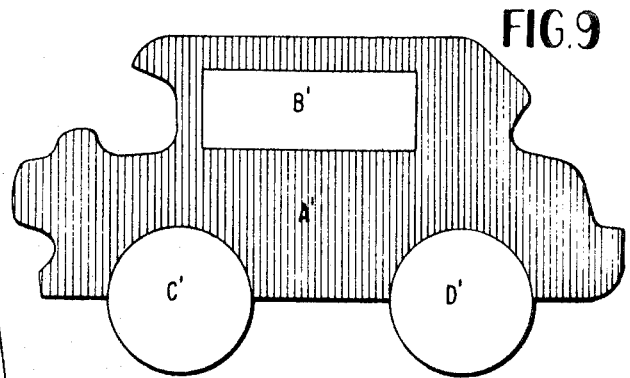
FIG.9
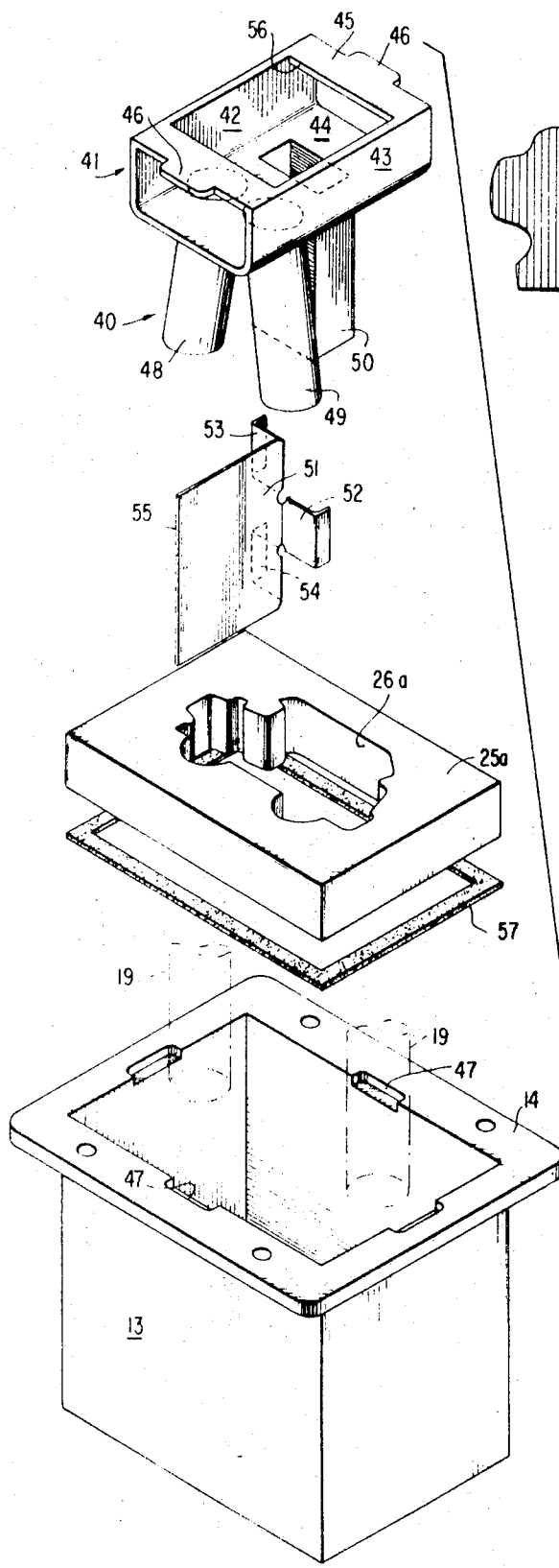
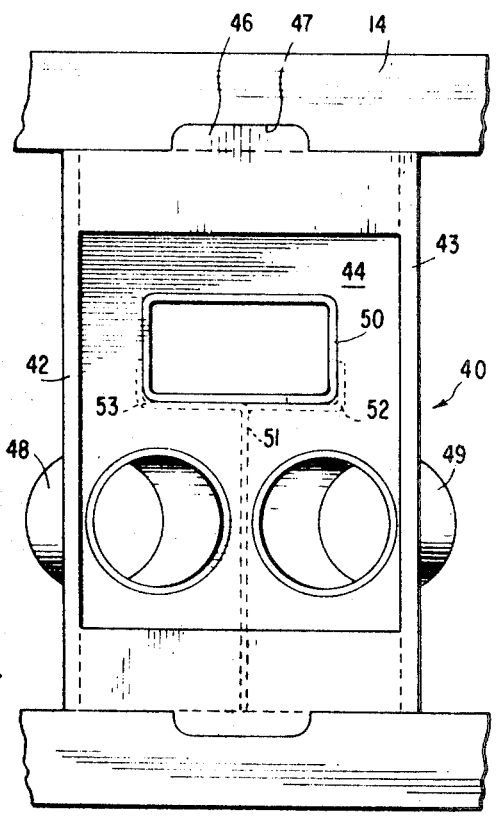
FIG.8
FIG.7
INVENTORS
LESTER JOHN FOX
SIDNEY B. McMILLION
BY Brown, Schuyler & Beveridge
ATTORNEYS

U.S. PATENT 3,522,775
METHOD OF PRODUCING MULTIHUED FROZEN CONFECTIONS AND ALL PURPOSE NOZZLE ASSEMBLY THEREFOR

This is a continuation of Ser. No. 670,904, filed Sept. 27, 1967, which is now abandoned.

BACKGROUND OF THE INVENTION

This invention relates to a method and apparatus for forming multi-hued frozen confections and in particular to a method for forming confections and an all-purpose nozzle assembly for forming a variety of flat frozen confections having different object shapes with adjoining areas of the shape being a confection of contrasting hues arranged in distinctive outline form.

A large market exists for frozen confection novelties in which the frozen confections represent objects or persons appropriate to an event or a season. Examples of such items are confections representing Santa Claus, an automobile, a pumpkin, a Christmas tree, etc. Not only should the peripheral outline of the confection represent the object or person intended but different areas of the confection should be of a contrasting hue or color in order to present an accurate and attractive portrayal of the object. The mass production of such novelty items on a large scale at a low cost presents serious problems. If the confections are to be produced economically, a simple apparatus must be utilized which requires a minimum of labor and handling in producing various shaped multi-hued confections. Molds of various shapes can be utilized in forming the novelty confections but the costs are very high as a large number of molds of complex shape must be utilized and the process of filling different portions of the mold with a different hued confection and removing the confection from the mold after freezing are complex and costly. The problem is aggravated by the strict requirements of sanitation imposed by the public health agencies involving the equipment and processes.

The production of bars of ice cream or other frozen confections by the extrusion process disclosed in U. S. Patent 2,739,545 provides a rapid and economical manner of producing individual bars. In this process the individual bars of ice cream are formed by continuously extruding a semi-frozen mix of the ice cream, which is sufficiently plastic to flow but will retain any shape into which formed for a moderate period, through a nozzle which has a cross sectional outline shape conforming to the desired shape of the bar and periodically passing cutters across the lower open end of the nozzle to sever slices from the emerging extruded length of soft ice cream which form bars of equal thickness. The severed slices of plastic ice cream mix fall into a conveyor surface passing below the nozzle and are transported by the conveyor through a refrigeration compartment at sub-freezing temperatures.

Accordingly, an object of this invention is to provide a method and apparatus for forming frozen confections of various appropriate shapes in which adjoining areas are of contrasting hues in distinctive outline form.

Another object of this invention is to provide a method and apparatus for forming the multi-hued confections representing various and appropriate object shapes by the continuous extrusion process.

Yet still another object of this invention is to provide an all-purpose nozzle assembly for attachment to an ice cream extrusion machine which can be utilized for producing multi-hued objects of different shapes.

Yet still another object of this invention is to provide an all-purpose nozzle for an ice cream extrusion machine capable of producing a wide variety of object shapes and which can be easily maintained in a clean and sanitary condition.

These objects have been attained by developing an all-purpose extrusion nozzle which can be affixed to a conventional ice cream extrusion machine of the type described in U.S. Pat. 2,739,545. This newly developed extruder nozzle is utilized in conjunction with easily replaceable extruder plates having extrusion openings defining various object outline forms in conjunction with insertable longitudinally extending partitions in the nozzle interior to establish different shaped compartmentalized areas into which are introduced different colored ice cream or frozen confection mixes and caused to flow from the opening in the bottom extruder plate for severing into slices of the desired outline shape which can be hard frozen in the usual manner.

Preferred embodiments of this invention will be described in detail with reference to the following drawings in which:

FIGURE 1 is a front elevation of the all-purpose nozzle with feed tubes attached as it would appear on an ice cream extrusion machine.

FIGURE 2 is a plan view of the device shown in FIGURE 1 with the top cover plate partially cut away.

FIGURE 3 is an exploded, perspective view of the extruder nozzle with the extruder plate and partitions necessary to form the Santa Claus confection illustrated in FIGURE 6.

FIGURE 7 is an exploded, perspective view of the extruder nozzle assembly with another extruder plate and partitions utilized to form the automobile confection illustrated in FIGURE 9.

FIGURE 8 is a plan view of the centrally located partition assembly illustrated at the top of FIGURE 7 and installed in place within the extruder nozzle.

FIGURE 9 represents the automobile frozen confection produced by the equipment illustrated in FIGURES 7 and 8.

Figure 4:
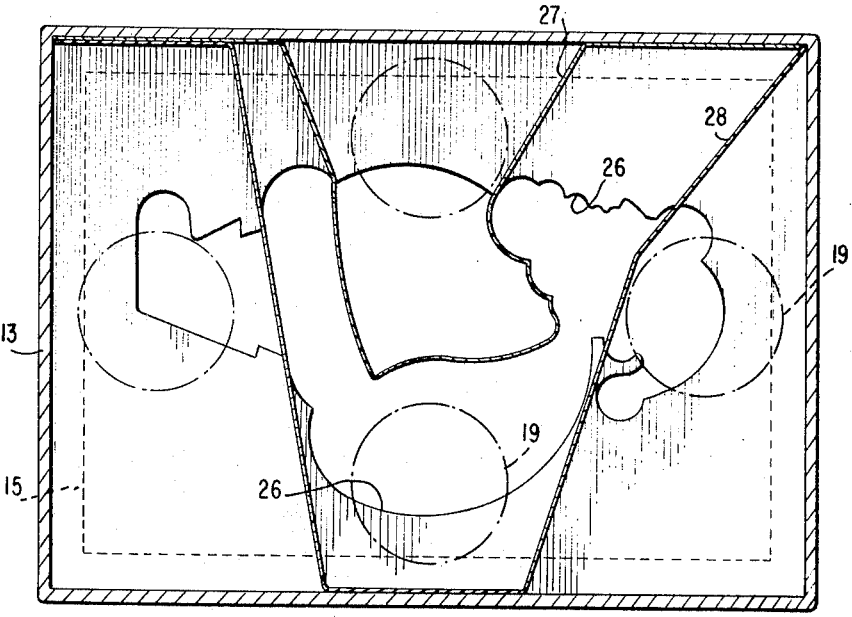
FIGURE 4 is a section taken along section lines 4-4 of FIGURE 1 with the extruder plate and partitions of FIGURE 3 in place.

FIGURE 1 illustrates the nozzle assembly 10 as it is installed on a frozen dessert extrusion machine (not shown) of the type disclosed in U. S. Patent 2,739,545 to be located vertically above the moving conveyor belt 11 of the machine which carries the slices served by the cutting wires 12 into the freezing compartment (not illustrated) of the extrusion machine. The nozzle assembly includes an annular nozzle passage 13 having confining peripheral walls and two open ends. The nozzle 13 in the illustrated embodiments is an open ended cylinder of rectangular cross section with flat sides in which the opposite walls are parallel, although the cross sectional shape of the cylinder could be changed to that of another convenient shape such as circular or elliptical. A mounting flange 14 extends outwardly peripherally of the nozzle 13 at one end and the other open end of the nozzle has a lip 15 extending inwardly from the interior of the nozzle passage.

A cover plate 16 extending across the open top of the nozzle 13 and the flange 14 may be affixed by the bolts 22 to the nozzle to overlie the upper surface of the flange 14 with the gasket 17 interposed between the cover plate and the flange to seal off the top portion of the nozzle 13. The cover plate 16 is pierced by several conically tapered holes 18 which are spaced apart on the cover plate to overlie the interior of the nozzle 13 when the cover plate 16 is installed. A hollow feed tube 19 having a collar 20 near one end with a tapered outer surface complementary to that of the tapered hole 18 extends through each of the cover plate holes 18 to protrude a short distance into the interior of the nozzle 13 in the manner illustrated in FIGURE 5. The collar 20 is drawn into sealing contact with the tapered hole 18 in the cover plate and the feed tube 19 is affixed thereto by the engagement of the threads of the screw coupler 21 with the threads from the feed tube just above the collar 20 to sealingly affix the tubes 19 to the nozzle.

The lower end of the feed tube 19 below the collar 20 has a transversely extending cap 23 which extends across the tube interior and immediately above this cap the tube wall is pierced with three elongaged openings 24 equally spaced around the periphery of the tube and separated by the bridging segments 37 to provide side openings in the bottom of the tube through which the frozen confection mix will emerge in separate streams radially of the tube axis. In the particular configuration of the tube utilized in the illustrated embodiment, the feed tubes are 1 inch tubes with a 7/8 inches internal bore. The external diameter of the cap is 1 1/8 inches, the width of each of the three openings 24 is 5/16 inch and the adjacent ends of each of the three openings are spaced apart 1/8 inch so that the total length of each elongated opening approximates the internal diameter of the tube and the width of the tube opening is slightly less than one third its length.

A relatively thick extruder plate 25, preferably of a plastic material such as Plexiglas, with an outline form closely conforming to the interior dimensions of the lower portion of the nozzle 13, rests on and is supported by the lip 15 with the lower, outer edge of the extruder plate being grooved to hold the gasket 57. The central portion of the extruder plate contains a cut-out area 26 representing the outline form of the object being represented by the confection, in the embodiment of FIGURES 1-5 being the outline form of the Santa Claus figure represented in FIGURE 6. The extruder plate should be moderately thick so that the outline object of the figure is well defined and in the actual embodiment this extruder plate approximates 1/2 inch in thickness.

Figure 5:
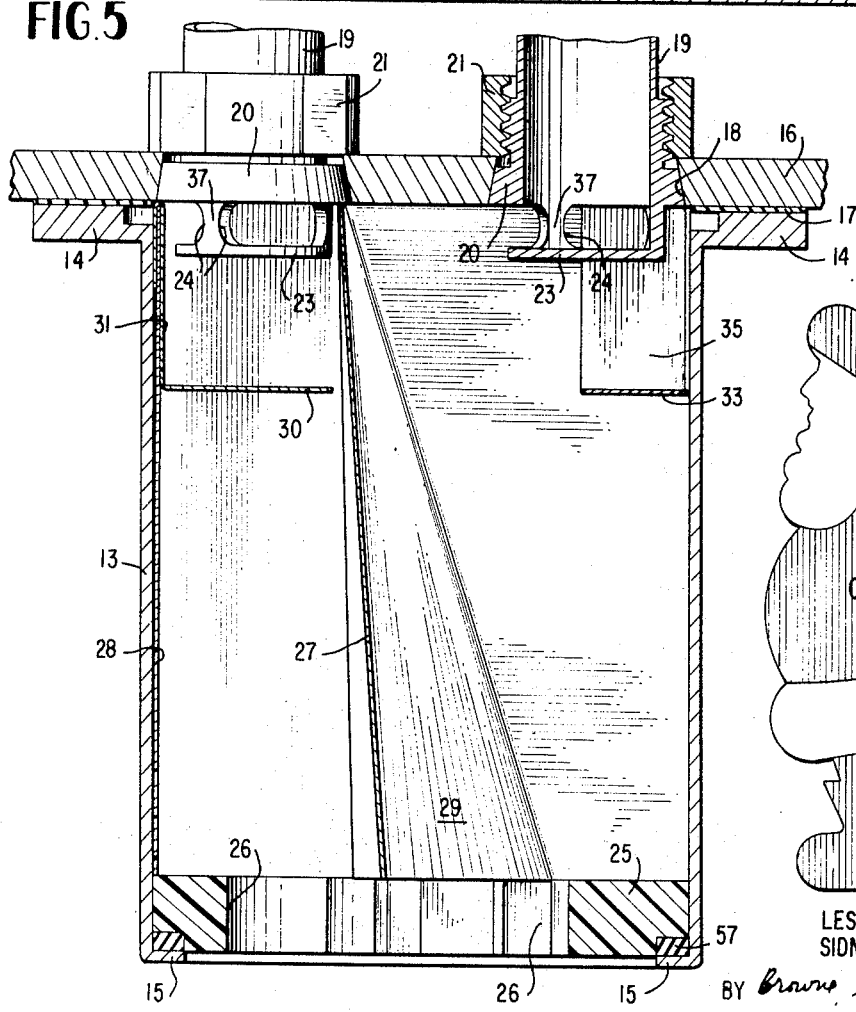
FIGURE 5 is a section taken along section lines 5-5 of FIGURE 1 with the extruder plate and partitions of FIGURE 3 in place.
Figure 6:
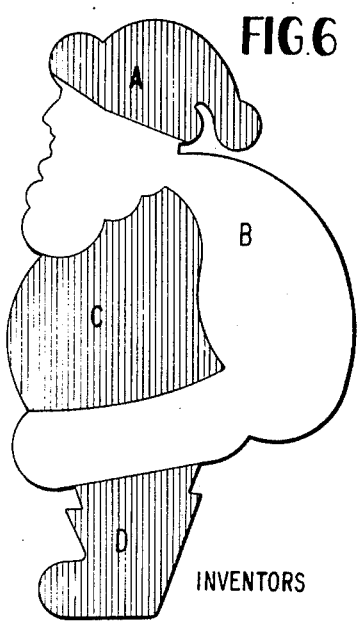
FIGURE 6 represents the Santa Claus frozen confection produced by the equipment illustrated in FIGURES 1-5.

Referring now to FIGURE 6 illustrating the Santa Claus figure, although the outline of the cut out 26 in the extruder plate represents the outline figure of the Santa Claus, this Santa Claus figure is shown to comprise four adjoining areas, A, B, C, and D in which the ice cream or frozen confection comprising the adjoining areas is of a contrasting hue to make the figure more life-like and attractive. Two shaped partitions, or inserts, 27 and 28 extending longitudinally of the interior of the nozzle passage 13 extend from the cover plate 16 to the extruder plate 25 to divide the interior of the nozzle passage into four compartmentalized segments of which each compartment includes the separate areas A, B, C and D of the Santa Claus figure. The outermost partition 28 cuts across the top and lower portions of the figure to form a separator for the areas A and D at the top and bottom of the Santa Claus figure, the partition being maintained in place by the springing action of the opposite edges of the partition against the opposing walls of the nozzle 13. The innermost partition 27, contained within the outer partition 28, has the lower portion shaped to define the area C of the Santa Claus figure with the severely shaped portion 29 of the partition 27 tapering inwardly and upwardly as illustrated in FIGURE 3. The feed tubes 19 are arranged in the cover plate 16 so that at least one feed tube lies within each of the four compartmentalized segments of the nozzle passage 13, as is readily apparent from FIGURE 4. A baffle 30 is removably supported by a top edge of the outermost partition 28 to underlie the nozzle 19 which feeds mix into the compartment from which portion B of the Santa Claus figure is produced, this baffle 30 constituting a generally L-shaped piece of metal with the vertically extending leg 31 folded back on itself as a clip 31a for attaching to the edge of the partition 28 for support. A segment at the center of the top edge of the partition 28 is notched at 32 to hold the baffle clip 31a in place. Another baffle 33 having a generally U-shape is supported by the folded back end portions 34a and 35a of the vertically extending legs 34 and 35 from opposite, top edges of the innermost baffle 27 to underlie the feed tube 19 feeding the area B of the Santa Claus figure, as illustrated in FIGURE 5, the baffle clips 34a and 35a being held in place by the notches 36 in the upper edges of the partition 27. The feed tubes 19 overlying the two baffles 30 and 33 are positioned so that the bridges 37 which separate the adjacent cut-out areas 24 are located as indicated in FIGURE 2.

In assembling the various components of the all-purpose nozzle assembly to produce the Santa Claus figure, the rubber gasket 57 is placed on the lip 15 of the nozzle and the Plexiglas extruder plate 25 with the Santa Claus cut-out is then placed in the bottom of the nozzle to rest on the lip 15 and the gasket 57. Next the outermost partition 28 is inserted into position so that the bottom edge rests on the extruder plate 25 with the center segment resting adjacent one wall of the nozzle passage interior and the ends pressing against the opposite wall, in the manner illustrated in FIGURE 4. The innermost partition 27 is then inserted into position inside the outer partition 28 with one end portion between the outer partition and the nozzle passage, as indicated in FIGURE 4. The two baffles 30 and 33 are then clipped into position on the top of the respective partition. The bridges 37 on the baffle tubes are properly located when tightening the coupler nuts 21 and the cover plate 16 is placed over the gasket 17 on the flange 14 and cover plate affixed to the flange by tightening the bolts and nuts 22.

As is readily apparent, a large variety of objects can be produced with this all-purpose nozzle assembly 10 by utilizing a variety of extruder plates each with a different cut-out area to represent the outline of the object which is being represented by the confection, along with suitable partitions extending longitudinally of the nozzle 13 between the extruder plate 25 and the nozzle cover plate 16, to provide the desired internal outlined shapes for the object. One such arrangement of extruder plates and partition was described above with respect to the Santa Claus figure and another will be described involving the accessories of FIGURES 7 and 8 which will produce the shape of the automobile represented by FIGURE 9. As before, the extruder plate 25a rests on the gasket 57 and is supported by the lip 15 at the bottom of the nozzle 13 of FIGURE 7, which is the same nozzle as is illustrated in FIGURE 1-5. However, in this instance the shape of the cutout 26a is the outline figure of the automobile illustrated in FIGURE 9, in lieu of the Santa Claus previously illustrated. The automobile of FIGURE 9 contains four separated and distinct areas, A', B', C' and D' representing the body, the windows and the wheels, respectively of the automobile, these adjoining areas being of contrasting hues of confection.

The windows and wheels of the automobile, areas B', C' and D', are formed by the partition assembly 40 which is supported to overlie the extruder plate 25a within the central interior of the nozzle passage 13. This partition assembly 40 comprises an upper box-like body 41 having two sides 42 and 43, a bottom 44 and a top 45 containing a centrally located rectangular cut-out area 56, the two ends adjacent the sides 42 and 43 being open. The opposite ends of the top 45 over the open ends have outwardly extending support tabs 46 which rest in the recesses 47 in the flange 14 on opposite sides of the nozzle interior. Two side-by-side, circular wheel tubes 48 and 49 extend downwardly from the bottom 44 at a small outward inclination, the tubes being hollow and communicating with the interior of the body 41 of the partition assembly. A rectangularly shaped window tube 50 extends downwardly from the bottom of the body 41 of the partition assembly, much in the same manner as the wheel tubes 48 and 49, this window tube 50 being hollow and communicating with the interior of the body 41. The length of the wheel and window tubes, 48, 49 and 50 is such that they extend downwardly to the cut-out area 26a of the extruder plate 25a when the support tabs 46 of the partition assembly are resting within the recesses 47 of the flange 14. The length of the box 41 is such that the open ends are blocked by the sides of the nozzle 13 when the partition assembly is in place. A generally T-shaped support clip 51 with outwardly extending arms 52, 53 and 54 is placed between the two wheel tubes 48 and 49 with the base edge 55 of the clip resting against the interior wall of the nozzle and the support arms 52, 53 and 54 clipped around the periphery of the window tube in the manner indicated in FIGURE 8. Two of the feed tubes 19 (not illustrated) are positioned to extend through the cut-out 56 of the body 41 into its interior to provide the mix which flows through the wheel and window tubes 48, 49 and 50 to form the wheel and window areas C', D' and B' respectively, of the confection. Two other feed tubes 19 are located to extend into the interior of the nozzle on either side of the body 41 of the partition assembly to supply the mix which forms the body portion A' of the car shape as indicated in the phantom lines in the bottom figure of FIGURE 7.

It is not intended to imply that the illustrated partitions and extruder plates are the only accessories which can be assembled into a nozzle assembly to produce appropriate shapes. For example, an extruder plate could be utilized having the cut-out of a pumpkin, or other appropriate object, and suitable partitions could be installed within the interior of the nozzle 13 between the extruder plate and the nozzle cover plate to form the desired internal outline areas to formulate an attractive and easily recognizable object. The other two recesses on the nozzle flange 14 of FIGURE 7 on opposite sides from the numbered ones 47 may be used with different accessory arrangements than these illustrated.

When the all-purpose nozzle assembly 10 has been assembled with the accessories necessary to produce the particular object which the confection is to resemble, the nozzle assembly is affixed to an extrusion machine of the type described in U. S. Patent 2,739,545 so that the lower end of the nozzle 13 with the extruder plate cut-out is in position so that the horizontally moving cutters 12 will pass across the lower face of the nozzle immediately above the conveyor belt 11. The feed tubes 19 are each connected to a source of semi-frozen confection in a plastically flowable but shape retaining condition. The source of the confection mix is such that a confection of different hues, and flavor if desired, flows through the feed tubes which terminate within the adjoining compartments defined by the various partitions inserted into the interior of the all-purpose nozzle so that the adjacent outlined areas of the cross section of the finished confection are in contrasting hues, similar to FIGURES 6 and 9. The different hued mixes are introduced under pressure through the feed tubes 19 into the various compartmented areas within the extruder 13 and emerge in the form of an extruded tube having an outline form corresponding to the outline 26 of the extruder plate, the mixes of adjoining compartments within the extruder merging together to form internal outlines which follow those of the partitions which extend across the area of the cut-out 26. As the shaped length of extruded material continuously emerges downwardly from the bottom of the nozzle 13, the cutters 12 are periodically reciprocated across the bottom of the nozzle 13 to sever a slice from the emerging extruding length. This slice falls under gravity onto the moving conveyor 11 and is transported into the freezing chamber of the extrusion machine for hardening. The cross sectional outline form of the partitions is retained within the interior of the shaped slice so that the represented object is presented realistically and attractively. Almost an unlimited number of different object forms may be produced in the all-purpose nozzle on an extrusion machine by utilizing extruder plates with different cut-out sections and partitions of varying shape.

We claim:

1. An all-purpose extruder nozzle assembly for producing flat, frozen confections of various object shapes having adjoining areas of different hues in distinctive outline form, said assembly comprising
    an annular nozzle passage having confining peripheral walls and open ends,
    one of said nozzle open ends having support means for affixing a cover plate to extend across said open end,
    a cover plate sealingly fitting onto said support means to cover said one nozzle open end and pierced by a plurality of spaced openings in the area over the nozzle interior.
    an extruder plate conformed to extend transversely across the other of said nozzle open ends and having a central cut-out portion conforming to an object outline shape,
    means for supporting said extruder plate in a position to be in sealing contact with and extending transversely across the peripheral portion of said other nozzle end,
    at least one removable partition insertable within said nozzle interior to extend longitudinally thereof between said extruder plate and said cover plate to divide the nozzle interior into a plurality of separate compartments with the lower portions of said partition overlying the extruder plate in conjunction with said cut-out portion defining adjoining outlined areas of different hues in the confection and
    at least one hollow feed tube sealingly affixed to extend through said cover plate holes into each said compartment with the lower end of the tube extending a short distance into the interior of said nozzle.

2. The nozzle assembly described in Claim 1 wherein said extruder plate support means includes an integral lip extending inwardly around the interior of said other nozzle end, and said extruder plate has peripheral dimensions closely conforming to the interior peripheral dimensions of the nozzle at said other nozzle end and rests on said lip in sealing contact therewith.

3. The nozzle assembly described in Claim 1 wherein said cover plate support means includes a flange integral with said nozzle extending outwardly peripherally of the nozzle exterior from said one open end and means for clamping said cover plate flatly against said flange in sealing relation.

4. The nozzle assembly described in Claim 3 wherein the cross sectional shape of said nozzle passage is uniform along its length between said flange and said lip.

5. The nozzle assembly described in Claim 4 wherein said extruder plate is of substantial thickness approximating one-half inch.

6. The nozzle assembly described in Claim 5 wherein said feed tubes are hollow cylinders with the end extending into said nozzle interior having a transverse cap to cover the end and immediately thereabove a plurality of openings in the tube sidewall spaced around its periphery to cause the mix to emerge in several separate streams radially of the tube axis.

7. The nozzle assembly described in Claim 6 wherein said openings comprise three elongated openings equally spaced about the tube periphery with the length of each opening approximating the tube interior diameter and the height of the opening approximating one-third its length.

8. A method of forming flat frozen confections of various object shapes having adjoining areas of different hues and distinctive outline form comprising the steps of
    passing a conveyor beneath the lower open end of a vertically arranged annular nozzle passage,
    supporting an extruder plate with a centrally located cut-out section having the outline form of an object shape within the bottom open end of said nozzle to extend transversely thereof,
    installing at least one replaceable partition extending longitudinally of the interior of said nozzle to segregate the interior thereof into a plurality of compartmentalized segments such that the partition wall defining the lower end of each said segment overlying said extruder plate conforms to an outlined area of one hue in the confection,
    locating a cover plate over the top portion of said nozzle to isolate from each other each of said compartmentalized segments,
    introducing under pressure into the top portions of each adjoining ones of said compartmentalized segments a different hued mix of said confection in a cold, plastically flowable, shaped retaining condition,
    flowing said segregated mixes of different hues through said nozzle interior to emerge from the cut-out of said extruder plate as an extruder length of mix having a cross sectional shape and multihue outline form conforming to said cut-out and compartmentalized segments at the lower end of said nozzle,
    periodically passing a cutting member transversely through said extruded length emerging from the lower end of said nozzle to sever a portion of the emerging mix which falls vertically onto said conveyor and,
    passing said conveyor with severed shaped portions of said mix thereon through a refrigerated compartment at subfreezing temperatures to harden the shaped multihued confection.